Patented Nov. 7, 1939

2,178,622

UNITED STATES PATENT OFFICE 2,178,622

PROCESS FOR PRODUCING TETRACHLORETHYLENE

Georg Basel and Erich Schaeffer, Burghausen, Upper Bavaria, Germany, assignors to Dr. Alexander Wacker Gesellschaft für Elektrochemische Industrie, G. m. b. H., Munich, Bavaria, Germany, a corporation No Drawing. Application February 19, 1938, Serial No. 191,576. In Germany February 22, 1937

6 Claims. (Cl. 260—654)

This invention relates to the production of tetrachlorethylene and has for its object to provide a simple and efficient process for this purpose.

Tetrachlorethylene is usually obtained by the splitting off of hydrochloric acid from pentachlorethane. However, we have found a new and improved process for producing tetrachlorethylene which consists substantially in passing a fully chlorinated paraffin hydrocarbon having at least six chlorine atoms, mixed with acetylene or certain other gases hereinafter described, over hot contacts; the corresponding quantity of hydrochloric acid being split off during the reaction.

Instead of acetylene it is possible to use ethylene or hydrocarbon chlorides containing two carbon atoms and containing no more chlorine atoms than tetrachlorethylene, for example dichlorethylene, trichlorethylene, tetrachlorethane, etc. For the fully chlorinated paraffin hydrocarbon it is possible to use hexachlorethane or fully chlorinated paraffin hydrocarbons with a greater number of chlorine atoms, for instance $C_3Cl_8$ or $C_4Cl_{10}$, but in such case the catalyst usually becomes more quickly unserviceable.

A simplification of the process may be effected by first producing in a single operation, by the action of chlorine upon tetrachlorethylene at an elevated temperature, a gaseous mixture of tetrachlorethylene, hexachlorethane and chlorine, and by thereupon conducting this mixture into the heated catalyst chamber to which acetylene or the like is continuously added. In the operation tetrachlorethylene and hydrochloric acid are obtained with a practically complete conversion of the initial substances. Instead of tetrachlorethylene, this process may also be initiated with other compounds which transform with chlorine while forming hexachlorethane.

The above mentioned reactions are generally carried out at temperatures of 200–400° C. and above. The application of overpressure makes it possible to increase the output but increases the price of the equipment. Dense bodies, such as china or glass shards may be used as contact surfaces. The use of porous contacts, particularly highly active ones such as charcoal, animal charcoal, activated carbon, silica gel and the like are usually preferred. We particularly prefer porous contacts of this type when impregnated with suitable substances such as chlorine derivatives of bivalent elements, e. g. copper chloride and the like, which promote the splitting off of hydrochloric acid.

The tetrachlorethylene obtained according to our invention may serve for effecting chemical conversions, or it may be used as a solvent for extraction, for cleaning fabrics, metals, etc.

Example 1

The catalyst chamber is filled with glass shards or activated carbon, or with activated carbon impregnated with copper chloride, and is maintained at a temperature of 200–400° C. A gaseous mixture of any of the following:

1. Hexachlorethane and trichlorethylene
2. Hexachlorethane and tetrachlorethane
3. Hexachlorethane and dichlorethylene is passed through the chamber in an approximately molar relation. In each case tetrachlorethylene is generated along with the corresponding quantity of hydrochloric acid at an almost theoretical transformation.

Example 2

The apparatus consists of an evaporator and preheater, which is filled for instance with sand and to which the catalyst chamber, heated to about 200–400° C., is attached. The catalyst chamber contains activated carbon. Tetrachlorethylene and chlorine and the vapor or gas mixture are continuously fed to the evaporator by being passed through the preheater, heated to about 200° C. It then enters the reaction chamber proper, into which acetylene is continuously fed. From the reaction chamber there issues a mixture of tetrachlorethylene and hydrochloric acid gas, which is cooled, whereby the first gas separates from the latter. The tetrachlorethylene obtained is very pure, and may contain small quantities of hexachlorethane. The feeding of chlorine and acetylene is so arranged that it corresponds to the following equation:

$$C_2H_2 + 3Cl_2 = C_2Cl_4 + 2HCl.$$

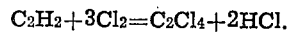

If a surplus of acetylene is used, then dichlorethylene and trichlorethylene also generate tetrachlorethylene.

Various changes may be made in the details of the foregoing process without departing from the scope and spirit of the invention as defined in the appended claims.

The invention claimed is:

1. Process for producing tetrachlorethylene which comprises reacting gaseous hexachlorethane and a gaseous unsaturated aliphatic hydrocarbon having two carbon atoms at a temperature of 200 to 400° C. in the presence of contact surfaces.

2. Process for producing tetrachlorethylene according to claim 1, in which the reacting gases are passed in contact with surfaces heated to a temperature of 200 to 400° C.

3. Process for producing tetrachlorethylene according to claim 1, in which the reacting gases are passed in contact with porous substances selected from the group consisting of charcoal, animal charcoal, activated carbon and silica gel.

4. Process for producing tetrachlorethylene according to claim 1. in which the reacting gases are passed in contact with porous bodies impregnated with a catalyst which promotes the splitting off of hydrochloric acid.

5. Process for producing tetrachlorethylene according to claim 1, in which the reacting gases are passed in contact with porous bodies impregnated with copper chloride.

6. Process for producing tetrachlorethylene which comprises reacting hexachlorethane and acetylene in the presence of contact surfaces at a temperature of 200 to 400° C.

GEORG BASEL.
ERICH SCHAEFFER.